US011521179B1

(12) United States Patent
Shetty

(10) Patent No.: US 11,521,179 B1
(45) Date of Patent: Dec. 6, 2022

(54) CONDUCTING AN AUTOMATED VIRTUAL MEETING WITHOUT ACTIVE PARTICIPANTS

(71) Applicant: West Corporation, Omaha, NE (US)

(72) Inventor: Santhosh Shetty, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 424 days.

(21) Appl. No.: 16/392,713

(22) Filed: Apr. 24, 2019

(51) Int. Cl.
*G06Q 10/10* (2012.01)
*H04L 65/403* (2022.01)

(52) U.S. Cl.
CPC ....... *G06Q 10/1095* (2013.01); *H04L 65/403* (2013.01)

(58) Field of Classification Search
None
See application file for complete search history.

(56) References Cited

U.S. PATENT DOCUMENTS

| | | | | | |
|---|---|---|---|---|---|
| 9,268,398 | B2* | 2/2016 | Tipirneni | ................ | G06F 3/048 |
| 9,626,955 | B2* | 4/2017 | Fleizach | ................ | G10L 13/08 |
| 2004/0117446 | A1* | 6/2004 | Swanson | ............ | H04L 12/1818 |
| | | | | | 709/205 |
| 2011/0040834 | A1* | 2/2011 | Schaefer | ............. | G06Q 10/109 |
| | | | | | 709/204 |
| 2011/0154204 | A1* | 6/2011 | Narayanaswamy | .. | H04L 65/403 |
| | | | | | 709/204 |
| 2014/0123027 | A1* | 5/2014 | Kozloski | ............ | G06Q 10/1095 |
| | | | | | 715/753 |

(Continued)

FOREIGN PATENT DOCUMENTS

| | | | | |
|---|---|---|---|---|
| EP | 2706491 A1 * | 3/2014 | ........... | G06Q 10/109 |
| EP | 2317692 B1 * | 5/2015 | ......... | G06Q 10/1095 |

(Continued)

OTHER PUBLICATIONS

Foote, Jonathan, John Boreczsky, and Lynn Wilcox. "Finding presentations in recorded meetings using audio and video features." 1999 IEEE International Conference on Acoustics, Speech, and Signal Processing. Proceedings. ICASSP99 (Cat. No. 99CH36258). vol. 6. IEEE, 1999. (Year: 1999).*

(Continued)

*Primary Examiner* — Brian M Epstein
*Assistant Examiner* — Derick J Holzmacher

(57) ABSTRACT

One example operation may include retrieving meeting participant profiles associated with meeting participants and meeting topics assigned to a scheduled meeting set to occur at a scheduled meeting time for a time duration, creating the meeting, at the scheduled meeting time, with a number of meeting intervals, collectively which comprise the time duration of the meeting, and each of the meeting intervals are assigned a respective different meeting topic among the meeting topics, assigning the participant profiles to one or more of the meeting intervals, automatically initiating a start to the meeting at the scheduled meeting time, without any of the meeting participants being connected to the meeting via their respective computing devices, and creating one or more of audio and video content based on one or more of the meeting topics and one or more meeting data files.

17 Claims, 8 Drawing Sheets

(56) References Cited

U.S. PATENT DOCUMENTS

| | | | | |
|---|---|---|---|---|
| 2014/0136630 A1* | 5/2014 | Siegel | ............... | G06Q 10/107 |
| | | | | 709/206 |
| 2016/0335605 A1* | 11/2016 | Tessler | ............... | H04L 51/04 |
| 2017/0308866 A1* | 10/2017 | Dotan-Cohen | ..... | G06Q 10/1095 |
| 2017/0339199 A1* | 11/2017 | Saez | ............... | H04L 65/4015 |
| 2018/0039951 A1* | 2/2018 | Wynn | ............... | H04N 7/15 |
| 2018/0095938 A1* | 4/2018 | Monte | ............... | G06F 3/0488 |
| 2018/0129371 A1* | 5/2018 | Fowler | ............... | G06F 3/0482 |
| 2018/0232705 A1* | 8/2018 | Baker | ............... | G06F 3/04817 |
| 2019/0073640 A1* | 3/2019 | Udezue | ............... | H04L 12/1818 |
| 2019/0108492 A1* | 4/2019 | Nelson | ............... | G06Q 10/1095 |
| 2019/0108493 A1* | 4/2019 | Nelson | ............... | G06Q 10/1095 |
| 2019/0108494 A1* | 4/2019 | Nelson | ............... | G06Q 10/1095 |
| 2019/0327103 A1* | 10/2019 | Niekrasz | ............... | G10L 15/26 |
| 2019/0361937 A1* | 11/2019 | Rogynskyy | ............ | G06F 16/2264 |

FOREIGN PATENT DOCUMENTS

| | | | | |
|---|---|---|---|---|
| EP | 3249594 A1 * | 11/2017 | ....... | G06F 17/30575 |
| WO | WO-2012167318 A1 * | 12/2012 | ........... | G06Q 10/109 |
| WO | WO-2018151992 A1 * | 8/2018 | ........... | G06Q 10/103 |

OTHER PUBLICATIONS

Topkara, Mercan, et al. "Tag me while you can: Making online recorded meetings shareable and searchable." IBM Research rep. RC25038 (W1008-057) (2010). (Year: 2010).*

Erol, Berna, D-S. Lee, and Jonathan Hull. "Multimodal summarization of meeting recordings." 2003 International Conference on Multimedia and Expo. ICME'03. Proceedings (Cat. No. 03TH8698). vol. 3. IEEE, 2003. (Year: 2003).*

* cited by examiner

300

350

CONDUCTING AN AUTOMATED VIRTUAL MEETING WITHOUT ACTIVE PARTICIPANTS

TECHNICAL FIELD OF THE APPLICATION

This application relates to the automated creation of meetings, and more specifically to conducting an automated virtual meeting without active participants.

BACKGROUND OF THE APPLICATION

Conventionally, meetings among peers in the workplace or other parties with common interests are performed in a relatively burdensome process. For example, an invitee may receive a letter in the mail, an e-mail, identify a bulletin posting, etc., that indicates a meeting will occur at a certain date and time, and the meeting generally requires a response to attend and in-person attendance or at least a live attendance via a remote communication network managed by a server and/or one or more user computing devices.

In more advanced online communication platforms, users may be reminded about an upcoming meeting via a calendar application, and reminded at the appropriate times to enter an upcoming online meeting with relative ease, however, such online meetings still require a moderator to login to the meeting application, open the meeting, and then others can login as well and begin communicating once the moderator has permitted such actions to occur. Meetings generally follow a set of topics over a defined period of time, which may be placed in an online meeting bulletin, such as an online presentation and/or other meeting application format. The users may be able identify what the topics are going to be throughout the course of the meeting and may decide when and whether to participate, if at all, during the course of the meeting, however, the user's presence is a distraction to other activities which could be performed during the meeting, as a result, the minimum amount of user participation time may be desirable by certain invitees to the meeting so those individuals can perform other tasks.

SUMMARY OF THE APPLICATION

Example embodiments of the present application provide at least a method that includes at least one of retrieving from memory, via a computing device, meeting participant profiles associated with meeting participants and meeting topics assigned to a scheduled meeting set to occur at a scheduled meeting time for a time duration, creating the meeting, at the scheduled meeting time, comprising a plurality of meeting intervals, collectively which comprise the time duration of the meeting, wherein each of the plurality of meeting intervals are assigned a respective different meeting topic among the meeting topics, assigning the participant profiles to one or more of the plurality of meeting intervals, automatically initiating a start to the meeting, via the computing device operating on a computer accessible network, at the scheduled meeting time, without any of the meeting participants being connected to the meeting via their respective computing devices, and creating one or more of audio and video content based on one or more of the meeting topics and one or more meeting data files stored in the memory, at the scheduled meeting time.

Another example embodiment may include an apparatus that includes a memory and a processor configured to retrieve from memory, via a computing device, meeting participant profiles associated with meeting participants and meeting topics assigned to a scheduled meeting set to occur at a scheduled meeting time for a time duration, create the meeting, at the scheduled meeting time, comprising a plurality of meeting intervals, collectively which comprise the time duration of the meeting, wherein each of the plurality of meeting intervals are assigned a respective different meeting topic among the meeting topics, assign the participant profiles to one or more of the plurality of meeting intervals, automatically initiate a start to the meeting, via the computing device operating on a computer accessible network, at the scheduled meeting time, without any of the meeting participants being connected to the meeting via their respective computing devices, and create one or more of audio and video content based on one or more of the meeting topics and one or more meeting data files stored in the memory, at the scheduled meeting time.

Another example embodiment may include a non-transitory computer readable storage medium configured to store instructions that when executed cause a processor to perform retrieving from memory, via a computing device, meeting participant profiles associated with meeting participants and meeting topics assigned to a scheduled meeting set to occur at a scheduled meeting time for a time duration, creating the meeting, at the scheduled meeting time, comprising a plurality of meeting intervals, collectively which comprise the time duration of the meeting, wherein each of the plurality of meeting intervals are assigned a respective different meeting topic among the meeting topics, assigning the participant profiles to one or more of the plurality of meeting intervals, automatically initiating a start to the meeting, via the computing device operating on a computer accessible network, at the scheduled meeting time, without any of the meeting participants being connected to the meeting via their respective computing devices, and creating one or more of audio and video content based on one or more of the meeting topics and one or more meeting data files stored in the memory, at the scheduled meeting time.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to automatically generate meetings, such as scheduled events, conferences, in-person meetings, online meetings, telephonic meetings, etc. The meetings are generated based on an analysis of meeting content which may include one or more of meeting data files, pre-recorded meeting audio/video, spoken comments which were recorded, e-mail messages which were created and analyzed by a computing device, short message service (SMS) messages which were created and analyzed by a computing device, telephonic discussions which were recorded, converted to textual information, and which were then analyzed by a computing device, such as a data management meeting server 130 coupled to a database (i.e., database 110 in FIG. 1A).

Figure 1A:
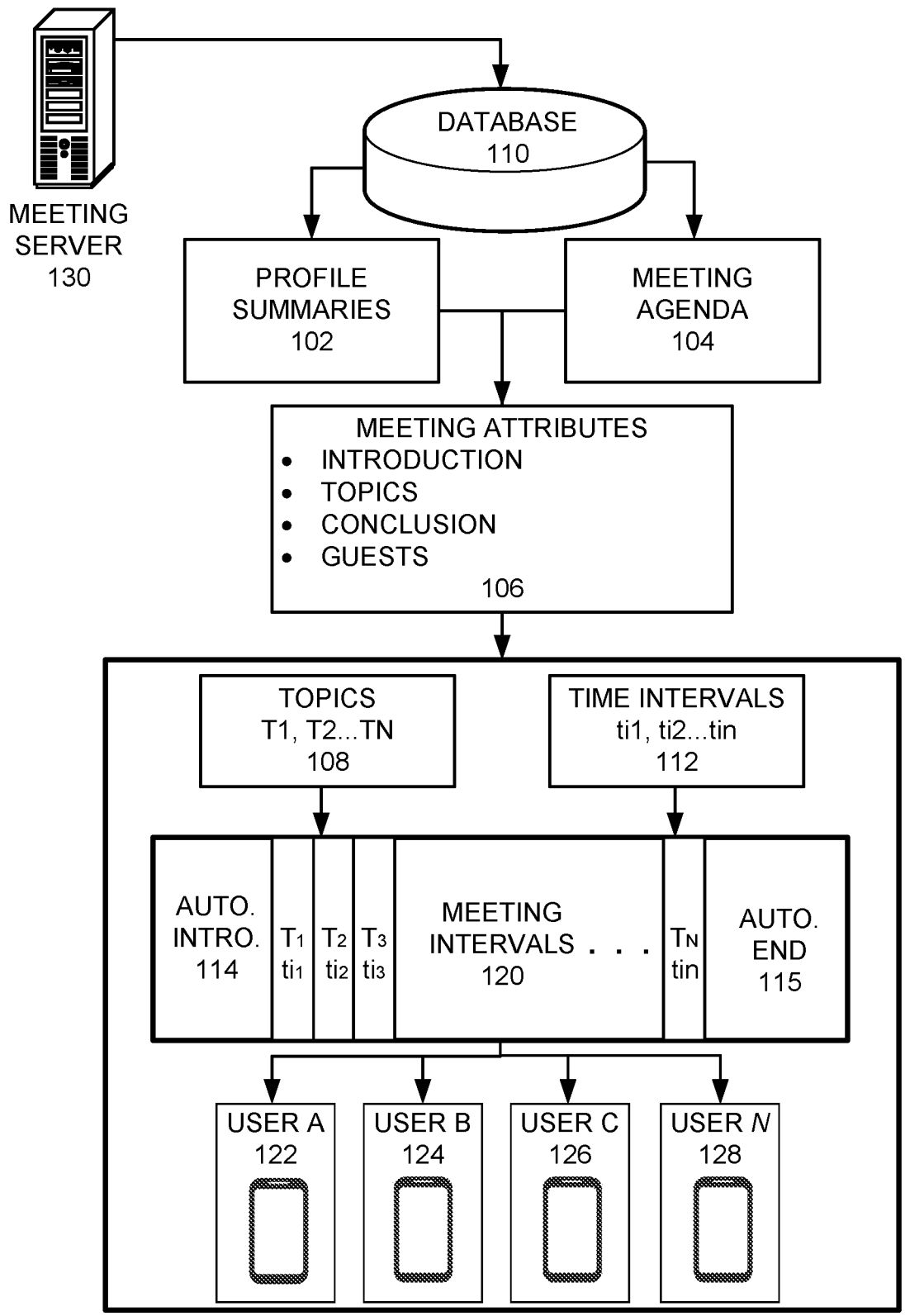
FIG. 1A illustrates an example automated meeting creation and assignment procedure according to example embodiments.

FIG. 1A illustrates an example automated meeting creation and assignment procedure 100 according to example embodiments. Referring to FIG. 1A, once a meeting is scheduled or other indicia is identified by the meeting server 130 indicating a need for a new meeting, the content may be analyzed to identify the purpose(s) of the meeting based on identified topics of interest to highlight in a meeting proposal/invite/summary. The topics can be words or phrases which are known and matched to the analyzed content used to drive the meeting creation. For example, an e-mail may have various terms and phrases, however, during a natural language processing analysis performed by the meeting server and/or related application, certain terms and phrases may be weighted higher due to their frequent occurrence when compared to other words and phrases and/or due to their identified relevance based on known words and phrases which are comparatively identified as being more important than other words and phrases, and thus should be the key data points for creating a meeting, determining which profiles to include in the meeting and to organize the meeting, one or two topics at a time.

In another example, the meeting may be setup by a scheduled meeting profile that is created by a user or via an automated meeting setup function. For example, a weekly or monthly meeting may require a main subject, such as weekly/monthly meeting, and may be setup at an appropriate time to execute and begin recording a meeting, such as an hour long meeting. The meeting may initiate at the maturity time and may reference a set of user profiles 102, which identify various employees and their job titles, job functions, meetings required to attend/participate, etc. The meeting agenda 104 may be a data file that identifies the meeting purpose/title, the various segments/intervals to include, each of which may be assigned one or more meeting topics and the topics may match the user profiles 102. Once an introduction file, such as a recorded summary of information is identified, the meeting may be created autonomously at the proper maturity date as a master file that includes the introduction, which may identify various meeting attributes 106, such as a summary of the topics to be included in the hour long meeting, the users which will be invited to add content to the meeting, and also a conclusion that summarizes the meeting. The meeting may begin as a recording of audio/video content with topics 108, time intervals 112 to separate the participants and their input and the various topics assigned to each interval, along with an automated introduction 114 and ending 115.

In operation, once the meeting is started a recording is performed to capture the automated introduction 114, which may be a computer generated voice that speaks aloud the meeting introduction, such as "this meeting is conducted on [generate date], to discuss [generate topic list] matters, for this [generate purpose] and will last [generate time]". The variables in brackets may be identified from the meeting attributes 106 and inserted accordingly. The automated voice may continue to introduce the participants based on their profiles 102 and none of the introduction requires any of the participants be participating in the meeting at that time. Once an interval begins after a minute or so into the meeting, such as ti1 based on topic T1, then the user's associated with that topic, such as "project management", "accounting", "engineering", etc., may be identified as candidates to contribute to that interval of time.

The user devices, such as smartphones, tablets, laptops, computers, etc., associated with those user profiles may then be identified and used as the recipient address for an invite that is created and sent during the respective time interval. For example, the master meeting file may have a registered user A designated as providing input on topics assigned to interval '1'. The user's device 122 may receive an invitation at that correct time and the first user to participate in the meeting may begin talking into their device's microphone so the voice can be captured for that interval. The meeting may automatically pause until the user accepts the prompt, for example, an application prompt, button, link, SMS message, etc., to accept the invitation and then begin talking. The meeting may be on hold and the recording may stop until the user submits their input. The prompt may include a question or topic and invitation to have the user speak their input on that topic, share a data file, etc. The user's input is received as voice, data files, media files, etc., and recorded as part of the master meeting file. Among all the participants, the meeting will generally only have active participants belonging to a specific interval at any time, and thus the total participants to the meeting will not be active at any given time and none of the participants will be active at the introduction or conclusion periods of the meeting. Each time interval may have more than one assigned topic and may have more than one invited participant based on the topics and the profiles of the participants. As a result, at any given time interval T1, T2, T3 . . . TN, the invites may be sent accordingly to those devices 122-128 which are assigned to those time intervals.

Figure 1B:
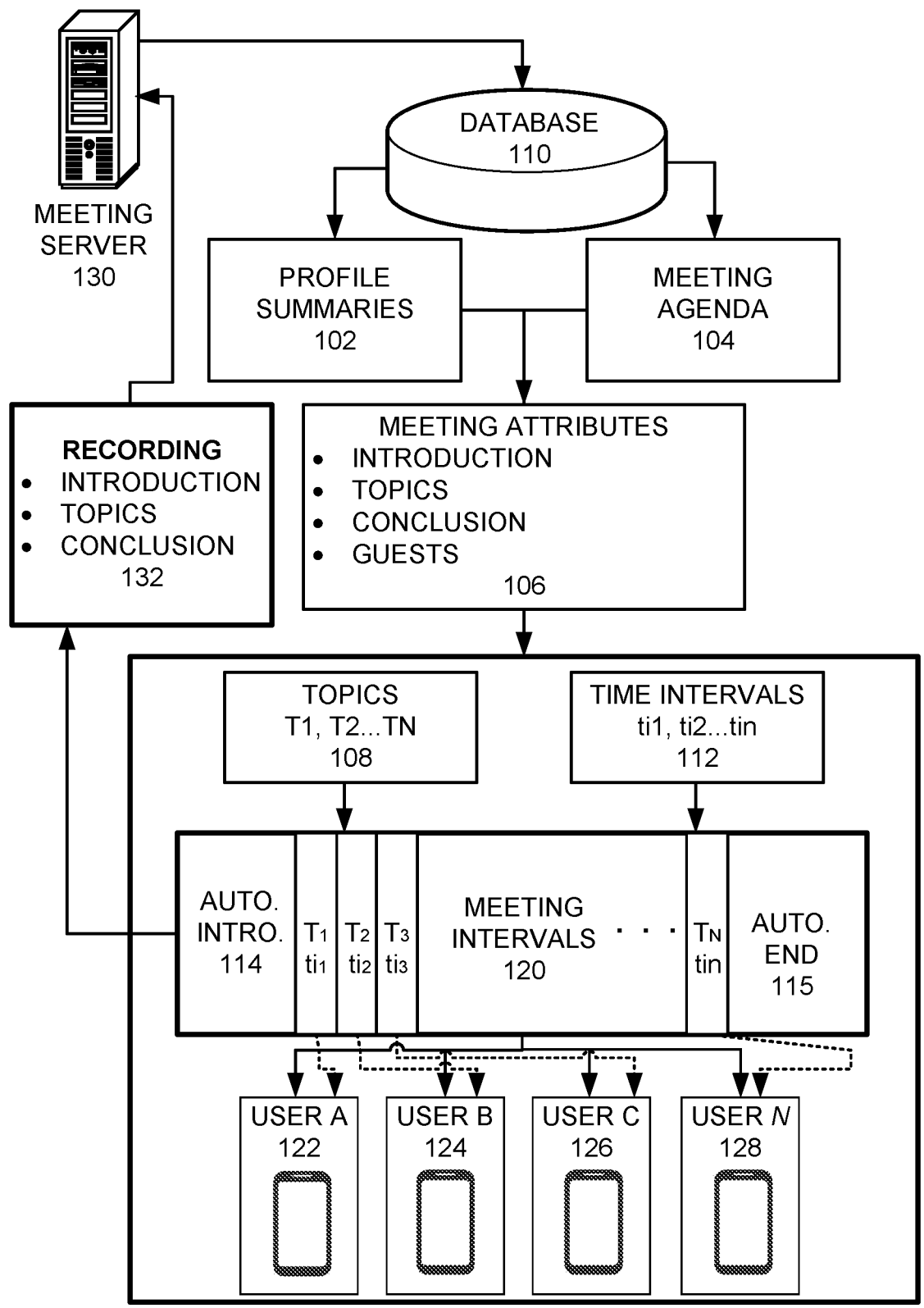
FIG. 1B illustrates an example automated meeting creation and assignment procedure with invites and requests for input according to example embodiments

FIG. 1B illustrates an example automated meeting creation and assignment procedure with invites and requests for input according to example embodiments. Referring to FIG. 1B, the configuration 150 provides a further example where the time intervals invoke messages being sent to the user devices. In this example, user device 122 is sent a notification to participate in the meeting via an online connection or phone connection when the first time interval matures, the user 'A' would then be the first participant to participate by providing input data at that time. The second time interval is setup to invoke an invitation be created and sent to user 'B' 124. The third is setup to invoke an invitation to user 'C' 126 and so on. As each user submits their input to automated questions related to the context of the time interval and its assigned topics, the information is recorded as part of those time intervals.

Figure 2:
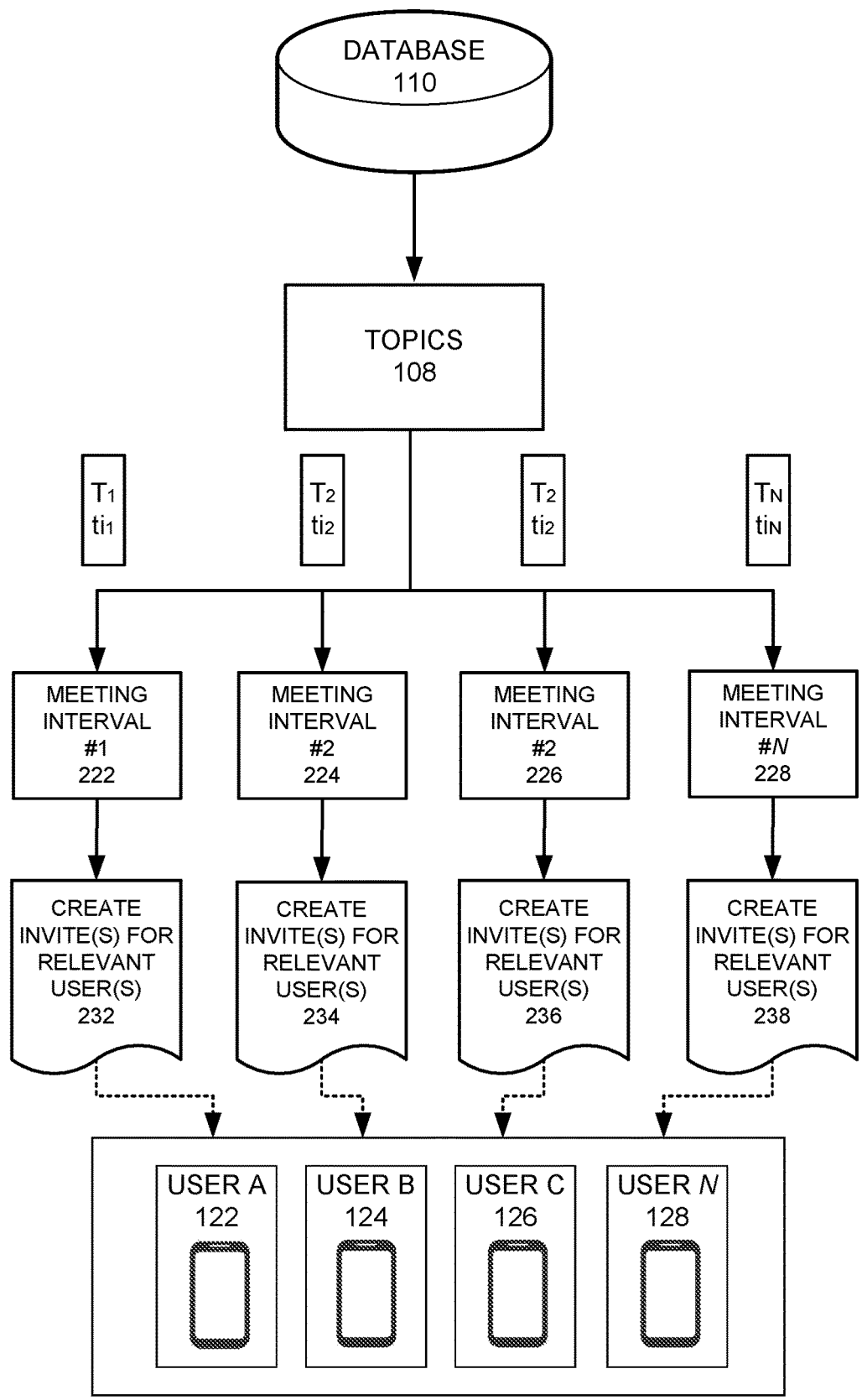
FIG. 2 illustrates an example automated meeting creation and assignment procedure for each meeting interval according to example embodiments.

FIG. 2 illustrates an example automated meeting creation and assignment procedure for each meeting interval according to example embodiments. Referring to FIG. 2, the configuration 200 provides an example meeting topic and time interval assignment process, the entire allocation of time interval segments may include meeting intervals (120) 222-228 assigned to various user accounts and respective user devices 122-128. For example, the first interval of the meeting may be designated for users A and B, while other segments may be designated for other combinations of user accounts depending on their profiles and confirmations received when invited by the automatic invitation process. Senior employees may be assigned important management segments and low-level team related tasks may be assigned to senior members which are part of those tasks and/or the non-senior employees which are working on those project tasks. During each interval, the identified invitees/participants are notified by invitations 232-238 to their respective user devices 122-128.

Figure 3A:
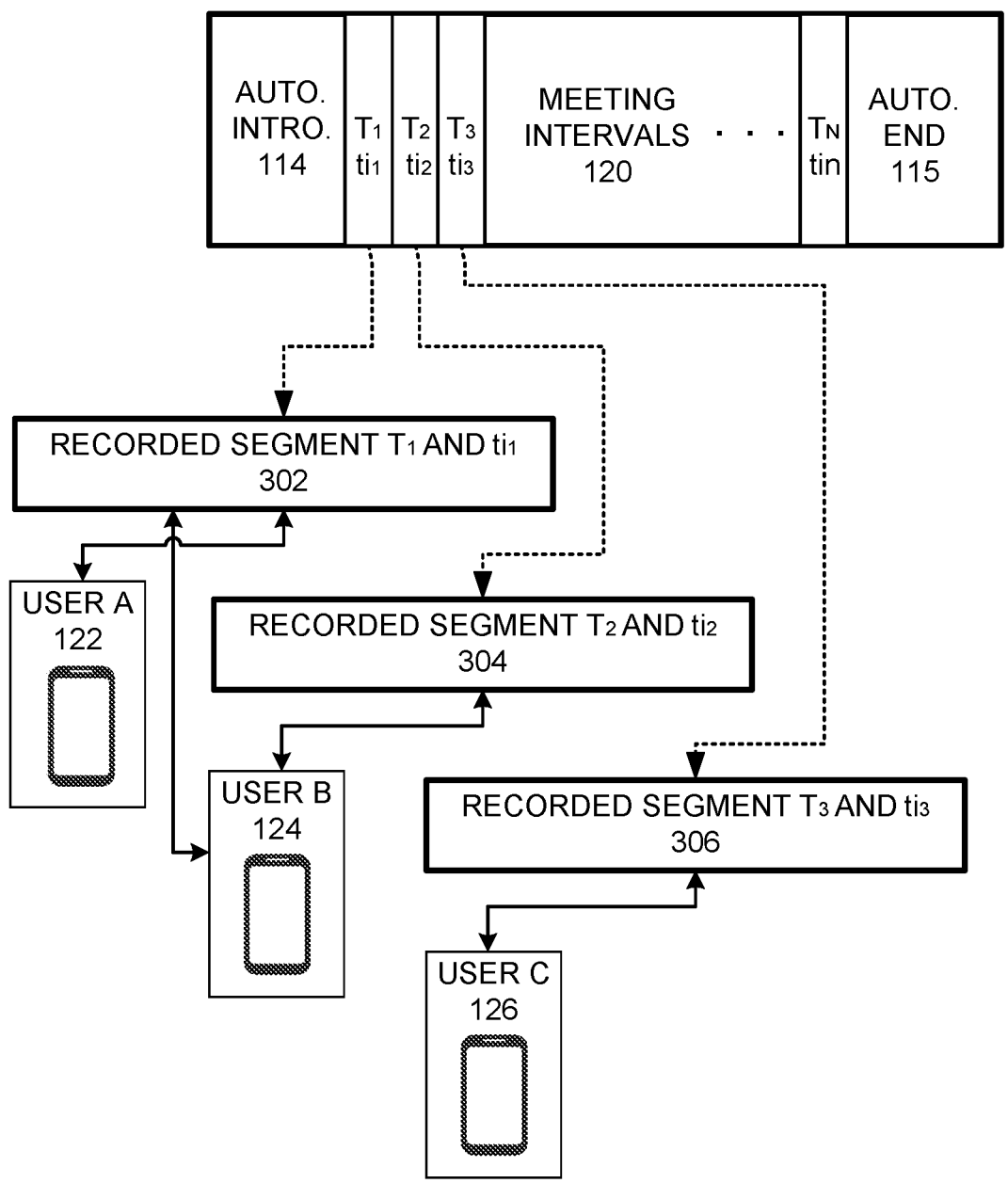
FIG. 3A illustrates an example meeting time interval recording and assignment procedure according to example embodiments.

FIG. 3A illustrates an example meeting time interval recording and assignment procedure according to example embodiments. Referring to FIG. 3A, the configuration 300 illustrates how the meeting contents includes various intervals with corresponding recorded segments 302, 304 and 306. In this example, the first recorded segment 302 includes input from user 'A' and user 'B' via their respective devices. The users may have been identified as being potential participants and may have both been invited to provide input to certain data topics, questions and/or information prompts provided by the automated meeting configuration. For example, as the first topic is identified, the user's that are listed as relevant participants may be notified via a preferred communication medium, such as e-mail or text or a notification via the application operating on their devices. The notification may include an audio file or written data that indicates the question and topics of interest and which asks the user about their input on such matters. The users may begin speaking or sharing a data file to append to the content of the meeting interval, and once they are done, they may stop sharing and the service may timeout or identify their lost connection as an indication of a completed session. The completed session may cause the next session to start automatically. In this example, the second session included content from user 'B' and the third session from user 'C'. Once the meeting intervals are completed, the automatic conclusion may be inserted into the meeting 115, which may include a pre-recorded message or a summary of data received, such as identifying those that contributed, those which did not contribute and certain topics parsed from each interval among other notes and comments.

Figure 3B:
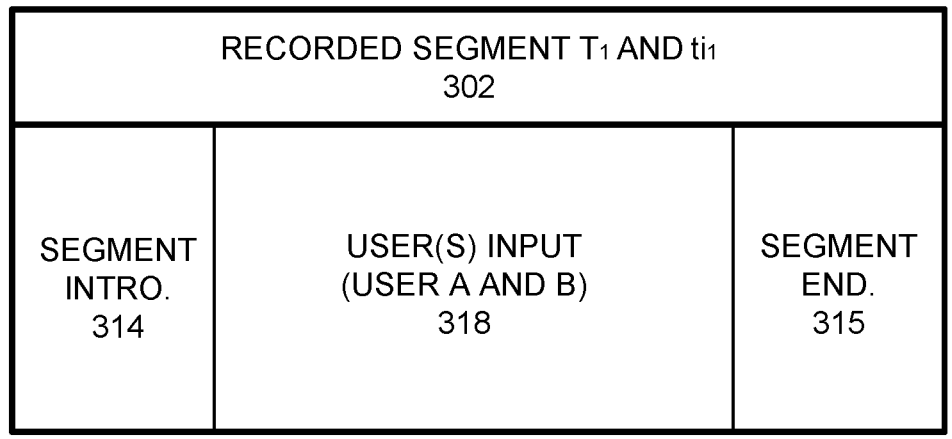
FIG. 3B illustrates examples of meeting intervals and recorded segments according to example embodiments.
Figure 3B:
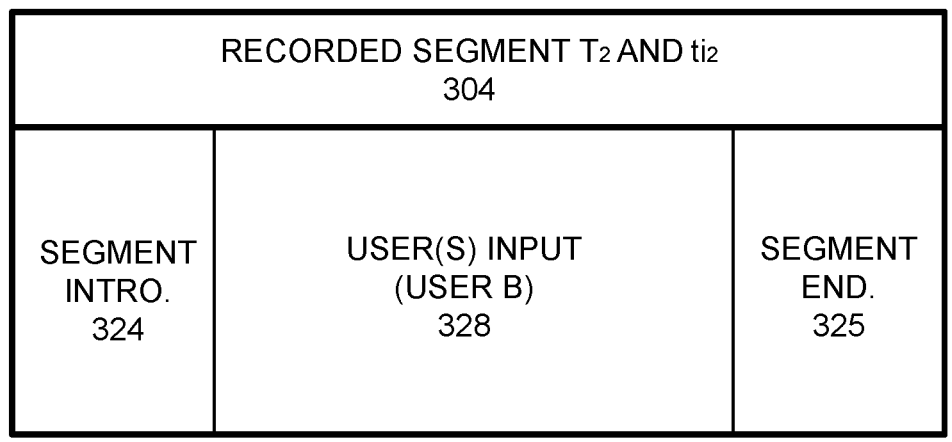
Figure 3B:
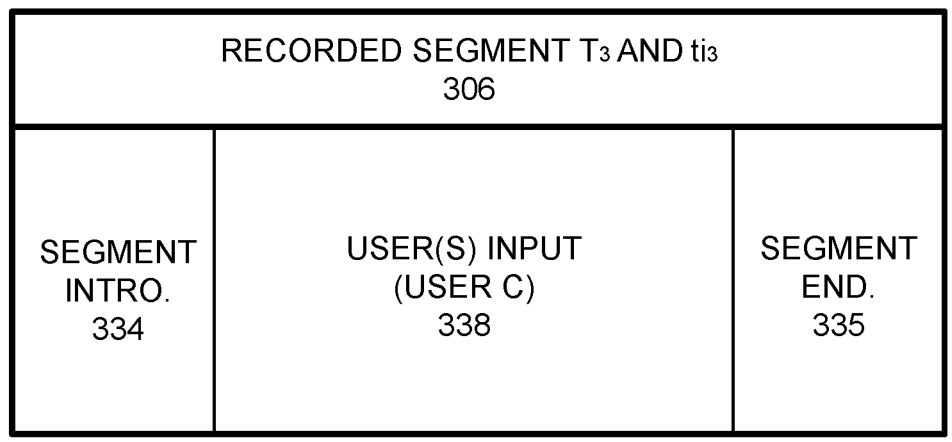

FIG. 3B illustrates examples of meeting intervals and recorded segments 350 according to example embodiments. Referring to FIG. 3B, the recorded segment for a particular time interval and topic may include a brief segment intro 314, which may be an automated section of text, audio and/or video content that introduces the topic(s) of discussion and the anticipated participants and their titles and likely discussion information, such as "now, we turn the floor over to employee [insert name], who works as a [insert title] and will be discussing [insert topic]". The tags for name, title and topic can trigger information to be retrieved from the master meeting file or supplementary meeting files and the user profile information. The segment introduction 314 can then be completed and an invite can be sent to the relevant user(s), so the users can then submit their input to the segment 318. After the segment is recorded, the segment may conclude with an ending 315 that includes a brief discussion of what was just discussed and the next topic of the next segment. Each other segment 304 and 306 may have a similar introduction 324 and 334, followed by a user input 328 and 338 and segment ending 325 and 335. Once all the segments are completed and automatic ending portion to the entire meeting may be created and added to the meeting to conclude the entire meeting.

Figure 4:
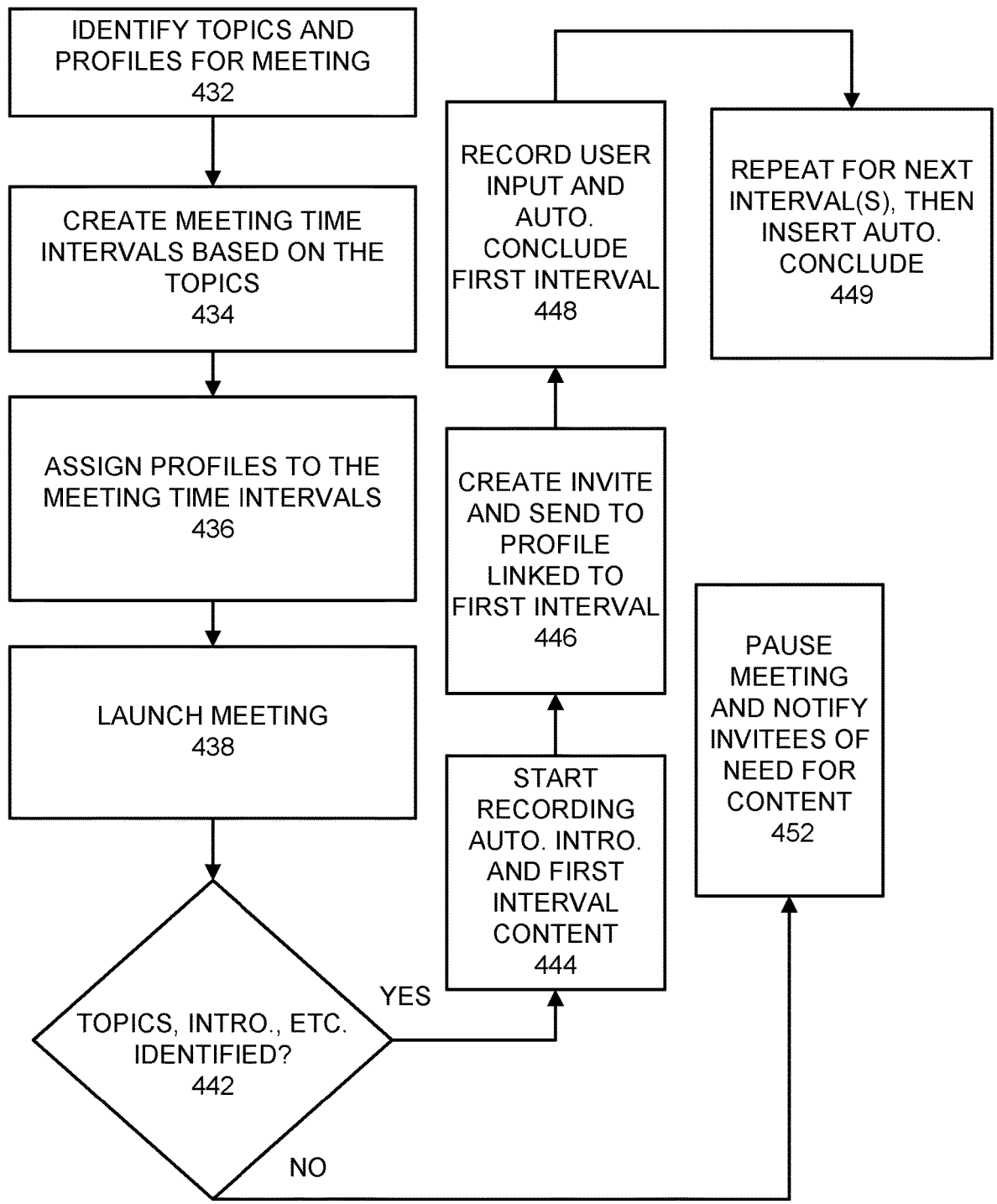
FIG. 4 illustrates an example flow diagram of an automated meeting creation configuration according to example embodiments.

FIG. 4 illustrates an example flow diagram of an automated meeting creation configuration according to example embodiments. Referring to FIG. 4, the example 400 provides retrieving from memory, via a computing device, topics and meeting participant profiles 432 associated with meeting participants and assigned to a scheduled meeting set to occur at a scheduled meeting time for a time duration. The method provides creating the meeting, at the scheduled meeting time, including a plurality of meeting intervals, collectively which include the time duration of the meeting 434, and each of the plurality of meeting intervals are assigned a respective different meeting topic among the meeting topics and assigning the participant profiles to one or more of the plurality of meeting intervals 436. The method may also include automatically initiating a start to the meeting 438, via the computing device operating on a computer accessible network, at the scheduled meeting time, without any of the meeting participants being connected to the meeting via their respective computing devices, and creating one or more of audio and video content based on one or more of the meeting topics and one or more meeting data files stored in the memory, at the scheduled meeting time.

The method may also include identifying an introduction portion and a first topic 442, if no information can be identified, then the invitees may be notified to contribute content 452. The method also includes starting the recording with the automated introduction and the first portion of the first interval 444. The first interval may include a recorded segment and no active user participation. The first segment with a first topic may cause a known participant to be sent an invite to participate 446. When the user device of the known participant receives the invite, the user can select to begin participating based on one or more questions or prompts which are sent as part of the invite. The application may continue by recording the user input as the next part of the next segment 448, then after the recording, the segment may automatically conclude 448 and the next interval may be started 449.

The method may also include transmitting, at a plurality of scheduled meeting interval times associated with the plurality of meeting intervals, meeting invites to the meeting participant computing devices to access the meeting via the computer network. The assigning of the participant profiles to one or more of the plurality of meeting intervals may include matching one or more participant profile attributes to the one or more topics assigned to the one or more meeting intervals. The method may also include creating the audio and video content based on one or more of the meeting topics at the scheduled meeting time by inserting one or more media slides and one or more audio segments into a master meeting file. During the participant participation, the method may include transmitting at least one of automated audio and video prompts to each of the participant computing devices during the meeting intervals assigned to each of the participants, and recording at least one of audio and video segments, for each participant segment received from the participant computing devices, in each of their respectively assigned meeting intervals. Also, after an introduction portion of the meeting has been recorded to include at least one of an automated introduction audio and video segment, the meeting invites are sent to the meeting participant computing devices to access the meeting via the computer network. The method may also include updating a master file to include a plurality of recorded audio and video segments including the participant segments received from the participant computing devices.

Figure 5:
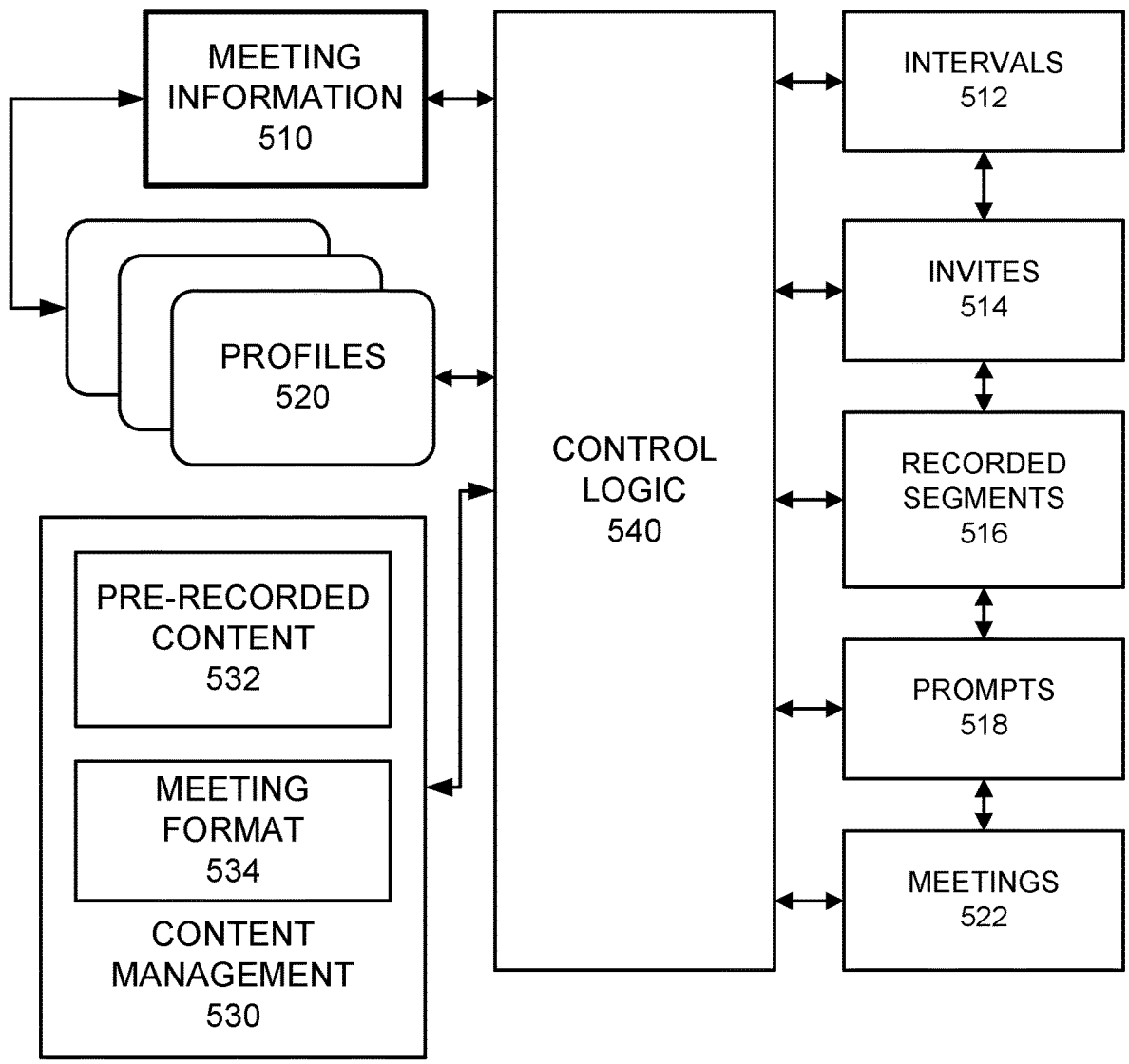
FIG. 5 illustrates an example logic control module configured to perform project parameter input and output management according to example embodiments.

FIG. 5 illustrates an example logic control module configured to perform project parameter input and output management according to example embodiments. Referring to FIG. 5, the logic configuration 500 provides a central logic module or processor 540 which receives input, such as meeting information 510, profiles of users 520, certain content 530, such as pre-recorded audio/video 532 and meeting format information 534, such as from a meeting file or other data format source. The input is processed to create certain outputs, such as meeting intervals 512, invites to participants 514, recorded segments 516, prompts 518 that notify users when and what to contribute to the meeting and the actual meetings 522.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
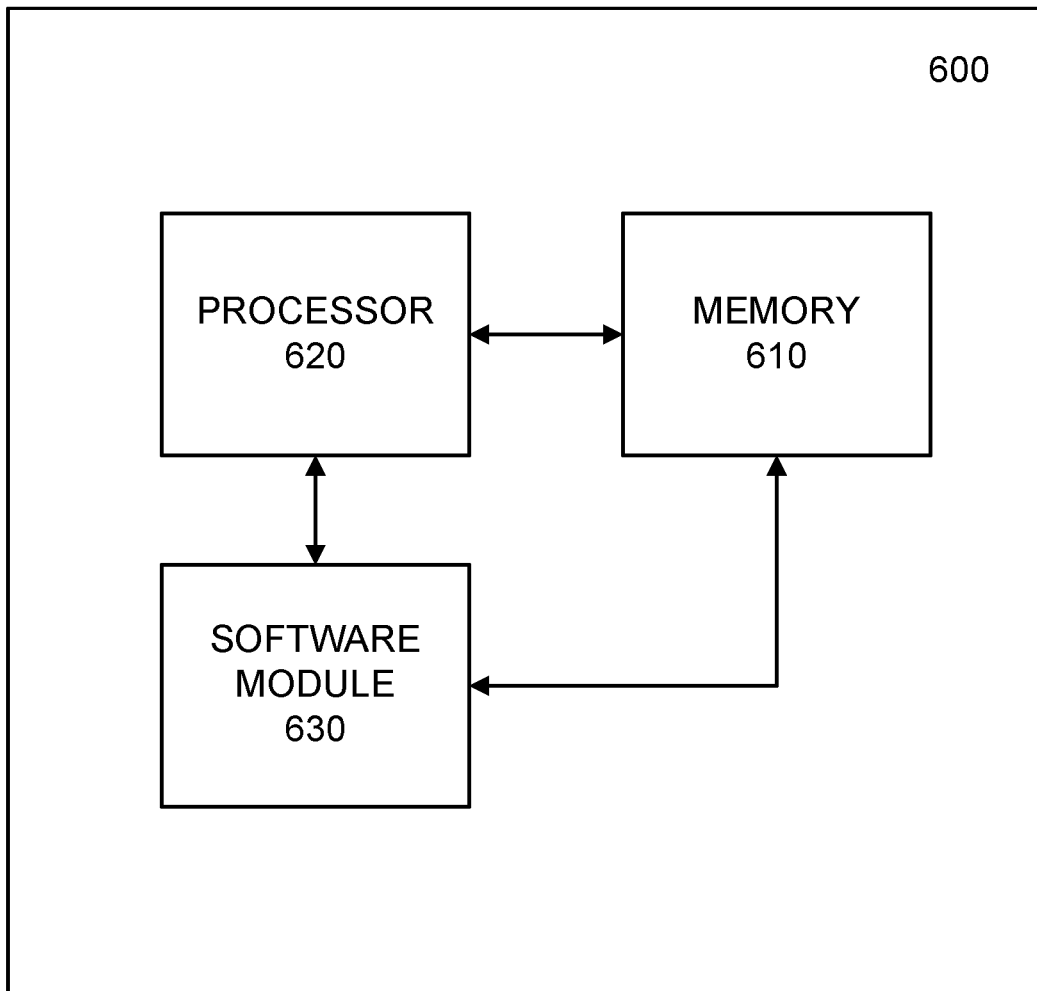
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   retrieving from memory, via a computing device, a file that includes meeting participant profiles associated with meeting participants and meeting topics assigned to a scheduled meeting set to occur at a scheduled meeting time for a time duration;
   starting the meeting, via a meeting application of the computing device, at the scheduled meeting time, and without any of the meeting participants being connected to the meeting via their respective computing devices;
   starting a recorder of the meeting application that records audio spoken within the meeting via the meeting application;
   after the recorder has been started, filling-in predefined areas of an audio script of a meeting introduction with the meeting topics from the file, outputting computerized speech within the meeting which speaks aloud the audio script within the meeting, and recording the computerized speech in a meeting file stored in a database;
   transmitting a first meeting invitation, via the meeting application, to a first meeting participant at a time of a first meeting topic in the file and after the starting of the meeting; and
   stopping the recording and waiting until receiving speech input from the first meeting participant within the meeting, and in response, restarting the recorder, recording the received speech input, and updating the meeting file in the database with the recorded speech input.

2. The method of claim 1, wherein the method further comprises assigning the meeting participant profiles to a plurality of meeting intervals based on different topics assigned to the meeting intervals.

3. The method of claim 1, wherein the recording the received speech input comprises inserting one or more media slides and one or more audio segments into the meeting file.

4. The method of claim 1, further comprising:
   transmitting at least one of automated audio and video prompts to the first meeting participant at the time of the first meeting topic; and
   recording at least one of audio and video segments, for each participant segment received.

5. The method of claim 1, wherein the transmitting comprises:
   after the meeting introduction has been recorded, transmitting the first meeting invitation.

6. The method of claim 5, further comprising:
   updating the meeting file to include a plurality of recorded audio and video segments including participant segments received from a plurality of meeting participants.

7. An apparatus comprising:
   a memory;
   a processor configured to
   retrieve from memory, via a computing device, a file that includes meeting participant profiles associated with meeting participants and meeting topics assigned to a scheduled meeting set to occur at a scheduled meeting time for a time duration;
   start the meeting, via a meeting application of the computing device, at the scheduled meeting time, and without any of the meeting participants being connected to the meeting via their respective computing devices;
   start a recorder of the meeting application that records audio spoken within the meeting via the meeting application;
   after the recorder has been started, fill-in predefined areas of an audio script of a meeting introduction with the meeting topics from the file, output computerized speech within the meeting which speaks aloud the audio script within the meeting;
   transmit a first meeting invitation, via the meeting application, to a first meeting participant at a time of a first meeting topic in the file and after the starting of the meeting; and stop the recording and wait until receiving speech input from the first meeting participant within the meeting, and in response, restart the recorder, record the received speech input, and update the meeting file in a database with the recorded speech input.

8. The apparatus of claim 7, wherein the processor is further configured to assign the meeting participant profiles to a plurality of meeting intervals based on different topics assigned to the meeting intervals.

9. The apparatus of claim 7, wherein the processor is further configured to insert one or more media slides and one or more audio segments into the meeting file.

10. The apparatus of claim 7, wherein processor is further configured to transmit at least one of automated audio and video prompts to the first meeting participant at the time of the first meeting topic, and record at least one of audio and video segments, for each participant segment received.

11. The apparatus of claim 7, wherein the processor is configured to transmit the first meeting invitation after the meeting introduction has been recorded.

12. The apparatus of claim 11, wherein the processor is further configured to update the meeting file to include a plurality of recorded audio and video segments including participant segments received from a plurality of meeting participants.

13. A non-transitory computer readable storage medium configured to store instructions that when executed cause a processor to perform a method comprising:
   retrieving from memory, via a computing device, a file that includes meeting participant profiles associated with meeting participants and meeting topics assigned to a scheduled meeting set to occur at a scheduled meeting time for a time duration;
   starting the meeting, via a meeting application of the computing device, at the scheduled meeting time, and without any of the meeting participants being connected to the meeting via their respective computing devices;
   starting a recorder of the meeting application that records audio spoken within the meeting via the meeting application;
   after the recorder has been started, filling-in predefined areas of an audio script of a meeting introduction with the meeting topics from the file, outputting computerized speech within the meeting which speaks aloud the audio script within the meeting, and recording the computerized speech in a meeting file stored in a database;
   transmitting a first meeting invitation, via the meeting application, to a first meeting participant at a time of a first meeting topic in the file and after the starting of the meeting; and
   stopping the recording and waiting until receiving speech input from the first meeting participant within the meeting, and in response, restarting the recorder, recording the received speech input, and updating the meeting file in the database with the recorded speech input.

14. The non-transitory computer readable storage medium of claim 13, wherein the method further comprises assigning the meeting participant profiles to a plurality of meeting intervals based on different topics assigned to the meeting intervals.

15. The non-transitory computer readable storage medium of claim 13, wherein the recording the received speech input comprises inserting one or more media slides and one or more audio segments into the meeting file.

16. The non-transitory computer readable storage medium of claim 13, wherein the method further comprises:
   transmitting at least one of automated audio and video prompts to the first meeting participant at the time of the first meeting topic; and
   recording at least one of audio and video segments, for each participant segment received.

17. The non-transitory computer readable storage medium of claim 13, wherein the transmitting comprises transmitting the first meeting invitation after the meeting introduction has been recorded; and
   updating the meeting file to include a plurality of recorded audio and video segments including participant segments received from a plurality of meeting participants.

* * * * *